April 10, 1962 P. F. BERGMANN Re. 25,154

MEANS FOR METERING LUBRICATING OIL FROM AN HYDRAULIC TAPPET TO A HOLLOW PUSH ROD

Original Filed April 17, 1959

INVENTOR.
PAUL F. BERGMANN
BY Price & Heneveld
ATTORNEYS

United States Patent Office

Re. 25,154
Reissued Apr. 10, 1962

25,154

MEANS FOR METERING LUBRICATING OIL FROM AN HYDRAULIC TAPPET TO A HOLLOW PUSH ROD

Paul F. Bergmann, Muskegon, Mich., assignor to Johnson Products, Inc., Muskegon, Mich., a corporation of Michigan Original No. 2,948,270, dated Aug. 9, 1960, Ser. No. 807,189, Apr. 17, 1959. Application for reissue Oct. 18, 1961, Ser. No. 146,410

13 Claims. (Cl. 123—90)

Matter enclosed in heavy brackets [ ] appears in the original patent but forms no part of this reissue specification; matter printed in italics indicates the additions made by reissue.

This invention relates to engine lubrication systems generally. Specifically, it relates to means for metering lubricating oil through a hollow push rod from a hydraulic tappet to a rocker arm member.

Engine valves in overhead valve automotive and other combustion engines are operated by rocker arm assemblies which require lubrication. Such rocker arm assemblies include a push rod member connected to a rocker arm member and supported on a hydraulic tappet. The hydraulic tappet rides on a valve timing cam. The tappet in most cases is supplied with lubricating oil from the engine lubricating system.

One system for lubricating rocker arm assemblies comprises a hollow push rod member and means for metering oil from the hydraulic tappet through the push rod member to the rocker arm member.

Lubrication of the rocker arm member, however, under normal operative conditions does not require the full flow rate of lubricating oil available in this system. Moreover, it is preferred that the oil be conveyed to the rocker arm member in more or less a steady stream rather than in spurts. Consequently, in such a system there is usually provided means for metering the flow rate of lubricating oil to substantially steady flow rate which is needed under the prevailing conditions.

Heretofore, such metering means have involved a valve assembly within the hydraulic tappet. By definition, a valve assembly comprises a movable part and, whenever a movable part is involved, problems of maintenance and service do arise. Thus, one disadvantage of a valve assembly in this lubrication system is the fact that it does have a movable part.

Another disadvantage of the valve assemblies heretofore used for metering lubricating oil from a hydraulic tappet to the rocker arm is the number of parts involved, some of which are nonfunctional except for retaining the movable parts in position. Such is not only a disadvantage from a cost point of view, but is also a disadvantage in that an extra step in the assembly operation may be involved.

Another disadvantage of valve assemblies in such a lubricating system is that such valves have heretofore been designed to operate within a predetermined range of lubricating oil pressures. In this regard, it is necessary that an excess of lubricating oil in the rocker arm gallery be prevented since such excess oil is readily drawn into the engine combustion chamber about the engine intake valves and burned. Consequently, since different makes of engines involve different lubricating oil pressures at the hydraulic tappets, it has heretofore been required to furnish each different make of engine with hydraulic tappets having specially designed valve assemblies for metering the flow of lubricating oil therefrom through the push rod members.

Still another disadvantage of the valve assemblies heretofore used in such lubricating systems resides in the fact that dirt particles in the engine oil tend to accumulate in and be trapped by the valve assembly and to block its operation.

It has been proposed to restrict the passageway between the hollow push rod and the tappet reservoir chamber by providing a small orifice but this has proven to be ineffective because the orifice clogs with dirt.

A general object of this invention is to provide means for metering the flow of lubricating oil from a hydraulic tappet through its hollow push rod member, which means avoid the foregoing disadvantages of valve assemblies in hydraulic tappets.

A specific object of this invention is to provide metering means for use in a hydraulic tappet for metering the flow of lubricating oil from the tappet through a hollow push rod member, which means involves a single, functional stationary part.

Still another object of this invention is to provide metering means which is operable over a large range of normally encountered, engine oil pressures in the hydraulic tappet and which, preferably, is suitable for any make of engine.

Another important object of this invention is to provide a metering means for hydraulic tappets which is positive in action and which is self-cleaning.

These and other objects which may appear as this specification proceeds are achieved by this invention which shall be described with reference to the drawings which form a material part of the disclosure. A brief description of the drawing is as follows.

Figure 1:
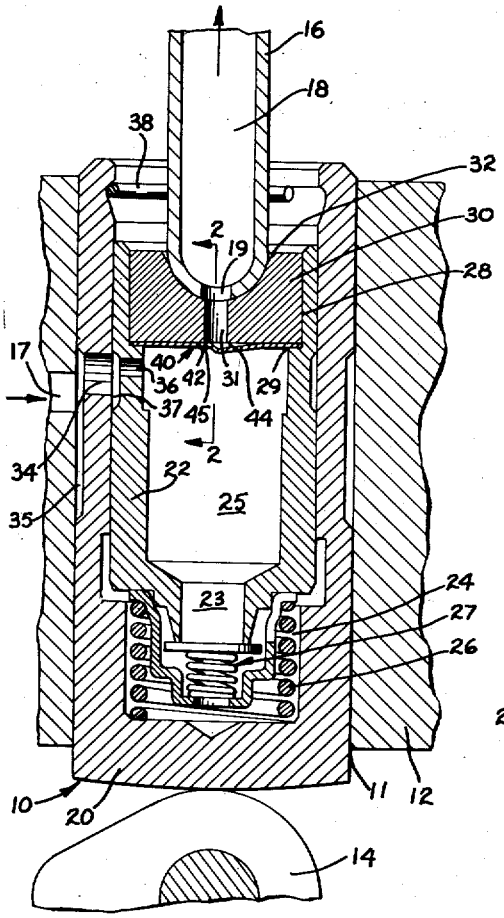
FIG. 1 is a cross sectional view of a hydraulic tappet and the terminal portion of the hollow push rod member with a preferred embodiment of the lubricating oil metering means of this invention.
Figure 2:
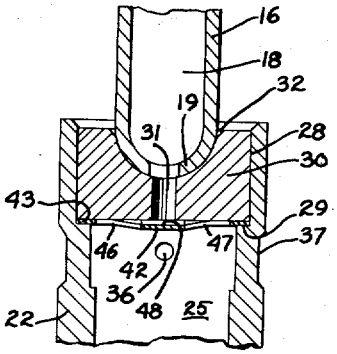
FIG. 2 is an enlarged, partial cross sectional view of adjacent portions of the hydraulic tappet and hollow push rod member of FIG. 1 with the cutting plane rotated 90° from the cutting plane of FIG. 1.
Figure 5:
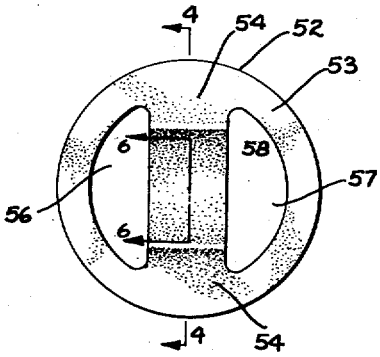

FIG. 5 is an enlarged, plan view of the metering means shown in cross sections in FIGS. 1 and 2. The section lines 1—1 indicate the view thereof shown in FIG. 1 which the section lines 2—2 indicate the view thereof shown in FIG. 2.

Figure 4:
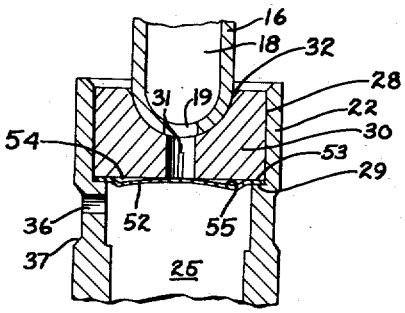

FIG. 4 is an enlarged, cross sectional view of adjacent portions of a hydraulic tappet and hollow push rod member showing another preferred embodiment of the metering means of this invention.

FIG. 5 is an enlarged plan view of the metering means shown in cross section in FIG. 4. The section lines 4—4 indicate the view of the metering means shown in FIG. 4. The section lines 6—6 indicate the view of the metering means shown in FIG. 6.

Figure 6:
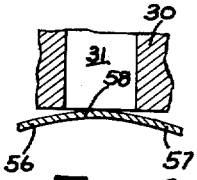

FIG. 6 is an enlarged view of the central portion of the metering means and adjacent portion of the push rod seat member.

The drawings, considered broadly, disclose a hydraulic tappet comprising an inner reservoir chamber capped by a push rod seat member having a coaxial passageway. The hydraulic tappet is provided with passageways for introducing lubricating oil into the reservoir chamber. Mounted on the push rod seat member is a hollow push rod having a coaxial inlet aligned with said passageway through said push rod seat. Between said push rod seat member and the reservoir chamber is the metering means of this invention.

As shown in the drawing, the metering means of this invention is based on the concept of a partition member bounded by a substantially peripheral rim portion. Within the area bounded by the rim portion of the partition member is a surface depressed slightly from the plane of said rim portion and aperture means. The most depressed portion of said depressed surface is disposed parallel to a center line of the partition member whereby when the partition member is in position, a portion of the coaxial passageway of the push rod seat member is covered and the remainder is uncovered. Thus, under operative conditions, the inlet to the coaxial passageway of the push rod seat member is partially restricted but in such a way that it is self-cleaning under operative condition. In addition, it is preferred that on one side of the depression the slope from the plane of the rim be quite abrupt and on the other side quite gradual.

Another concept broadly shown in the drawings is that within the area bounded by said rim portion of said partition member a portion of the surface on one side is depressed slightly in one axial direction from the plane of said rim portion while a portion of the surface on the other side is depressed slightly in the opposite axial direction from the plane of said rim portion. Thus, it makes little difference which side of the partition member is adjacent the push rod seat member in assembling the hydraulic tappet.

STRUCTURE

More specifically, FIG. 1 of the drawings discloses a hydraulic tappet 10 slidably mounted in a bore 11 of an engine block 12. The hydraulic tappet 10 is mounted in the bore 11 between a timing cam 14 and a push rod 16. The engine block 12, it will be observed, comprises a lubricating oil passageway 17 which functions to convey lubricating oil to the hydraulic tappet 10 in the bore 11. The push rod 16 is hollow, providing a lubricating oil passageway 18, and comprising at the end thereof a coaxial inlet 19 for admitting lubricating oil from the hydraulic tappet 10 to the passageway 18. The general structure and function is along the lines illustrated by FIG. 1 of U.S. Patent No. 2,818,050 to L. R. Papenguth.

The hydraulic tappet 10 comprises a hollow, generally cylindrical tappet body member 20 having a closed end and an open end. The closed end of the hollow tappet body 20 bears against the timing cam 14. Slidably disposed within the hollow tappet body 20 is a hollow plunger member 22. The hollow plunger member likewise comprises an open end and a closed end but, in this instance, the closed end is provided with a coaxial passageway 23. The closed end of the hollow plunger member 22 is disposed in the region of the closed end of the hollow tappet body member 20 and is displaced therefrom, whereby a pressure chamber 24 is formed between said closed ends. The interior of the hollow plunger member 22 comprises a reservoir chamber 25. Spring means 26 is disposed in the pressure chamber 24 and urges the hollow plunger member 22 towards the open end of the hollow tappet body 20. Also disposed within the pressure chamber 24 is a check valve assembly 27 which, in combination with the passageway 23, permits flow of lubricating oil from the reservoir chamber 25 to the pressure chamber 24 whenever the hydraulic pressure in said pressure chamber falls below the hydraulic pressure in said reservoir chamber by a predetermined difference. Whenever hydraulic pressure in the pressure chamber 24 is greater than the hydraulic pressure in the reservoir chamber 25, the check valve assembly 27 maintains the passageway 23 in closed condition. However, the pressure differential is relieved by "lead down," the leakage of oil from the pressure chamber 24 between the adjacent walls of the hollow tappet body 20 and hollow plunger member 22 to annular recess 37 as is well known in the tappet art.

In the open end region of the hollow plunger member 22 there is provided an annular recess 28 forming an annular shoulder 29. Within the annular recess 28 there is slidably disposed a push rod seat member 30 having a coaxial, interconnecting passageway 31 and a coaxial push rod seat 32 which receives the end of the push rod member 16.

Lubricating oil is introduced into the hydraulic tappet 10 from lubricating passageway 17 by means of a lateral passageway 34 through the hollow tappet body 20. The lateral passageway 34, it will be observed, is disposed within the region of a longitudinal, annular recess 35 about the outside of the hollow tappet body 20. Under normal operative conditions a portion of the annular recess is always opposite the outlet of passageway 17. Lubricating oil from the lateral passageway 34 enters the reservoir chamber 25 of the hollow plunger member 22 by way of a lateral passageway 36 through the wall of the hollow plunger member 22. The lateral passageway 36 is likewise disposed in the region of an annular recess 37 on the outside of the hollow plunger member 22, a portion of which under normal operative conditions is always opposite the outlet of the lateral passageway 34.

Lubricating oil flows under normal operative conditions from the reservoir chamber 25 into the coaxial passageway 31 of the push rod seat member 30 and from there through inlet 19 into the hollow passageway 18 of the push rod member 16. Such flow is metered, however, by the partition member 40 between the reservoir chamber 25 and the push rod seat member 30.

Figure 3:
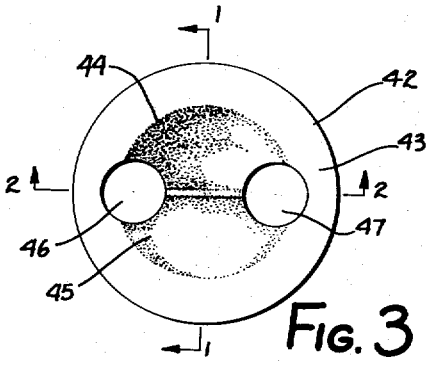

In the embodiment shown in FIGS. 1–3, the partition member 40 comprises a thin, circular disk 42 having a substantially planar, circumferential rim portion 43. The outside diameter of the rim portion 43 is sufficient to enable the circular disk 42 to be seated on the annular shoulder 29 at the end of the reservoir chamber 25 and adjacent the push rod seat member 30. The portion between the axis of the circular disk 42 and the rim portion 43 thereof is axially flexible. Moreover, within this portion there is provided a surface 44 depressed slightly from the plane of said rim portion 43. In this embodiment, the greatest depression occurs centrally and adjacent the diameter of the disk whereby the depressed surface 44 is semi-circular in area. In the preferred form of this embodiment the circular disk 42 comprises an inner, semi-circular surface 44 depressed slightly from the plane of said rim portion in one axial direction and another inner, semi-circular surface 45 depressed slightly from the plane of said rim portion in the opposite axial direction. The amount of depression in each direction is preferably between .002 and .003 inch. The greatest slope of depression occurs along the common diameter. Preferably, in this preferred form of the embodiment, the disk is centrally deflectable parallel to the axis thereof. Consequently, upon installation in a hydraulic tappet the depressed portion 45 will be flattened and the other 44 exaggerated. (See FIG. 1). The greatest depression of both surfaces 44 and 45 occurs in each side of, and in this embodiment, adjacent to a common diameter. To permit the passage of oil past the cylindrical disk 42, substantially large apertures 46 and 47 are provided. Each aperture is positioned for each depressed surface 44 and 45 between the rim portion 43 and a central axial portion corresponding to the interconnecting passageway 31 of the push rod seat member 30. In other words, when the circular disk 42 is in position in the hydraulic tappet 10, the apertures 46 and 47 underlie the push rod seat member 30 between the passageway 31 and the inside diameter of the annular recess 28 to that a solid, impermeable, surface 48 of the circular disk 42 underlies the entire area of the interconnecting passageway 31 of the push rod seat member 30. This surface 48 is spaced from the opening to passageway 31 and as shown in FIG. 2 provides communication between reservoir 25 and passageway 31 through apertures 46 and 47. The cross section through which the lubricant flows from the reservoir 25 into passageway 31 is flat but restricted and thus less likelihood of clogging exists.

In the embodiment of FIGS. 4–6, the partition member 40 comprises a circular disk 52 having a substantially planar, circumferential, rim portion 53. Between the rim portion 53 and the axis of the circular disk 52 on both sides of a common diameter, one side of the circular disk 52 has a pair of depressions 54 and 55. Each depression is in the same axial direction. The greatest slope of each depression occurs in the region of the planar rim portion. Between the depressions 54 and 55 the curvature of the disk surface is [cylindual] *cylindrical*. Between the depressions 54 and 55 at the ends thereof the inner portion of the circular disk 52 is provided with a pair of relatively large apertures 56 and 57. As in the case of the first described embodiment, the portion of the circular disk which underlies the interconnecting passageway 31 of the push rod seat member 30, when in mounted position, is a solid, impermeable surface 58 spaced from the passageway 31 and providing a flat passage for flow of lubricant from reservoir 25 into passageway 31.

In both embodiments, it will be observed that a portion of the central, solid, surfaces 48 and 58 cover a portion of the cross sectional area of the interconnecting passageway 31. It will also be observed that part of the cross sectional area of the interconnecting passageway 31 is open. Hence, the partition member 40 in each embodiment partially closes the interconnecting passageway 31 and thereby restricts the flow of lubricating oil into the interconnecting passageway 31.

The hydraulic tappet 10 also has, in an annular groove in the open end region of the hollow tappet body 20, a spring retainer clip 38 for retaining the hollow plunger member 22, partition member 40 and rod seat member 30 within the hollow tappet body 20.

OPERATION

The basic operation of the hydraulic tappet 10 is well known and therefore need not be further described herein.

However, insofar as the hydraulic tappet 10 functions to deliver lubricating oil to the passageway 18 through the push rod 16, the operation will be described in detail.

Thus, in conjunction with the embodiment of FIGS. 1–3, lubricating oil from the reservoir chamber 25, being under hydraulic pressure, freely passes through the apertures 46 and 47 and through the space between the depressed surface connecting passageway 31. Flow through the flat restricted passageway along the depressed surface 44 and into the passageway 31 is restricted because of the limited cross sectional area of the space between the depressed surface 44 and the underside of the push rod seat member 30.

The partition member embodiment of FIGS. 4–6 functions in much the same way. Lubricating oil from the reservoir chamber 25 passes through the apertures 56 and 57 of the circular disk 52 into the space between the push rod seat member 30 and the annular depression 54 and along the cylindrical solid surface 58 to the annular opening presented by the passageway 31.

Thus, there is presented a metering means for hydraulic tappets which is of simple construction, comprising only one part, and which is stationary. Moreover, both embodiments of the metering means are self-cleaning. This occurs because during operation in the engine block 12, the hydraulic tappet 10 tends to rotate. The rotation results in a slow relative rotation between the push rod seat member 30 and the partition member 40. This slow relative rotation in each embodiment acts to provide a cleaning action which eliminates clogging of the apertures, of the space between the depressed portions of the partition member and the push rod seat member.

Other features and advantage of this invention will occur to those of ordinary skill in this art. Moreover, as this invention may be embodied in several forms without departing from the spirit or essential characteristics thereof, the embodiments just described are therefore illustrative and not restrictive, since the scope of the invention is defined by the appended claims rather than by the description preceding them, and all changes that fall within the metes and bounds of the claims, or that form their functional as well as conjointly cooperative equivalents, are therefore intended to be embraced by those claims.

I claim:

1. A hydraulic tappet comprising: a hollow plunger member having an open end; a rod seat member disposed at and closing said open end of said hollow plunger member, said rod seat member having a passageway; and a partition member between said rod seat member and the interior of said hollow plunger member, said partition member having an abutting portion abutting said rod seat member and entirely surrounding said passageway to prevent passage of liquid between said abutting portion and said rod seat member, and located between the center of said passageway and said abutting portion a depressed portion with a surface thereof depressed from said abutting portion with a part of said depressed surface underlying said passageway and another part of said depressed surface having an aperture therethrough.

2. A hydraulic tappet comprising: a hollow plunger member having an open end; a rod seat member disposed at and closing said open end of said hollow plunger member, said rod seat member having a passageway, and a partition member between said rod seat member and the interior of said hollow plunger member, said partition member having a substantially planar abutting portion abutting said rod seat member and entirely surrounding said passageway to prevent passage of liquid between said abutting portion and said rod seat member, and located between the center of said passageway and said abutting portion a depressed portion with a surface thereof depressed from the plane of said abutting portion along a line of maximum depression extending across a substantial part of said partition member and with a part of said depressed surface underlying said passageway and another part of said depressed surface have an aperture therethrough.

3. A hydraulic tappet comprising: a hollow plunger member having an open end; a rod seat member disposed at and closing said open end of said hollow plunger member, said rod seat member having a passageway, and a partition member between said rod seat member and the interior of said hollow plunger member, said partition member having a substantially planar marginal portion abutting said rod seat member and entirely surrounding said passageway to prevent passage of liquid between said marginal portion and said rod seat member and a depressed central portion with a surface thereof depressed from the plane of said marginal portion along a line of maximum depression extending across a substantial part of said partition member and with a part of said depressed surface underlying said passageway and another part of said depressed surface having an aperture therethrough; said surface on one side of said line of maximum depression having an abrupt change in slope from said plane.

4. A hydraulic tappet comprising: a hollow plunger member having an open end; a rod seat member disposed at and closing said open end of said hollow plunger member, said rod seat member having a central passageway; and a partition member between said rod seat member and the interior of said hollow plunger member, said partition member having a substantially planar marginal portion abutting said rod seat member and entirely surrounding said passageway to prevent passage of liquid between said marginal portion and said rod seat member; a central flexible portion having on one face thereof a surface with a first depression along a line of maximum depression extending across a substantial part of said partition member and located on one side of the center of the partition member and a second depression along a second line of maximum depression extending across a substantial part of said partition member and located on the other side of the center of the partition member, the slope of each depression being abrupt from said lines of maximum depression to said marginal portion and being more gradual from said lines of maximum depression to said center line and having an aperture through each of said depressions outside of the area of said surface underlying said central passageway.

5. A hydraulic tappet for a hollow push rod having an axial inlet at one end thereof for receiving lubricating oil from said tappet and for delivering the same to a rocker arm, which hydraulic tappet comprises: a hollow tappet body member having a closed end, an open end and a lateral oil infed passageway; a hollow plunger member slidably disposed within said hollow tappet body and having an open end, a closed end and a lateral oil infed passageway, the interior of said plunger member comprising a reservoir chamber, said open end having an inner annular recess, said closed end being disposed in the region of the closed end of said hollow tappet body member and displaced therefrom, whereby a pressure chamber is formed, said closed end comprising a passageway from said reservoir chamber to said pressure chamber; spring means in said pressure chamber urging said plunger member toward said open end of said tappet body member; check valve means in combination with said passageway for permitting flow of lubricating oil only from said reservoir chamber to said pressure chamber whenever the hydraulic pressure in said pressure chamber falls below the hydraulic pressure in said reservoir by a predetermined difference; a rod seat member for a push rod disposed in said inner annular recess of said plunger member and having a central passageway therethrough; a disk having a substantially planar marginal portion in said inner annular recess between said reservoir chamber and said rod seat member, said circular disk having an inner, semi-circular, surface depressed from the plane of said rim portion towards the closed end of said hollow plunger member with one part of said surface underlying said passageway and another part of said surface having an aperture therethrough; and means for retaining said hollow plunger member, said circular disk and said rod seat member in said hydraulic tappet.

6. A hydraulic tappet according to claim 5 wherein said means for retaining said hollow plunger member, said circular disk, and said rod seat member in a hydraulic tappet comprise said hollow push rod having an opening aligned with the passageway of said rod seat member.

7. Means for metering the flow of lubricating oil from a hydraulic tappet into a hollow push rod for delivery to a connecting rocker arm, which comprises: a circular disk having an outer, substantially planar, circumferential rim portion and an inner portion with a surface thereof depressed from the plane of said rim portion along a line of maximum depression extending across a substantial part of said partition member, and a part of said surface between said rim portion and the center part of said surface having an aperture therethrough.

8. Means for metering the flow of lubricating oil from a hydraulic tappet into a hollow push rod for delivery to a connecting rocker arm, which comprises: a circular disk having an outer, substantially planar, circumferential rim portion and an inner portion with a surface thereof depressed from the plane of said rim portion along a line of maximum depression generally parallel to a diameter in the plane of said rim portion, said surface on one side of said line of maximum depression having an abrupt change in slope from said plane and on the other side of said line a more gradual change in slope from said plane, a part of said surface between said rim portion and the center part of said surface having an aperture therethrough.

9. Means for metering the flow of lubricating oil from a hydraulic tappet into a hollow push rod for delivery to a connecting rocker arm, which comprises: a circular disk having a substantially planar rim portion and a central, flexible portion with a surface on one face thereof depressed in one direction along a line of maximum depression generally parallel and adjacent to a center line in the plane of said rim with a surface on the other face thereof depressed in the opposite direction along a line of maximum depression generally parallel and adjacent to said center line, each of said depressions being gradual from said lines of maximum depression to said marginal portion, and between said rim portion and a middle part of said central portion an aperture through each of said surfaces.

10. Means for metering the flow of lubricating oil from a hydraulic tappet into a hollow push rod for delivery to a connecting rocker arm, which comprises: a circular disk having a substantially planar rim portion and a central, flexible portion with a surface on one face thereof depressed in one direction along a line of maximum depression generally parallel and adjacent to a center line in the plane of said rim with a surface on the other face thereof depressed in the opposite direction along a line of maximum depression generally parallel and adjacent to said center line, each of said depressions being gradual from said lines of maximum depression to said marginal portion, and between said rim portion and a middle part of said central portion a plurality of apertures through each of said surfaces.

11. Means for metering the flow of lubricating oil from a hydraulic tappet into a hollow push rod for delivery to a connecting rocker arm, which comprises: a circular disk having a substantially planar rim portion and a central flexible portion having on one face thereof a surface with a depression along a line of maximum depression generally parallel to, and on one side of, a center line in the plane of said marginal portion with a depression along a line of maximum depression generally parallel to, and on the other side of, said center line, the slope of each depression being abrupt from said lines of maximum depression to said marginal portion and being more gradual from said lines of maximum depression to said center line, and between said rim portion and a middle part of said central portion an aperture through each of said surfaces.

12. Means for metering the flow of lubricating oil from a hydraulic tappet into a hollow push rod for delivery to a connecting rocker arm, which comprises: a circular disk having a substantially planar rim portion and a central flexible portion having on one face thereof a surface with a depression along a line of maximum depression generally parallel to, and on one side of, a center line in the plane of said marginal portion with a depression along a line of maximum depression generally parallel to, and on the other side of, said center line, the slope of each depression being abrupt from said lines of maximum depression to said marginal portion and being more gradual from said lines of maximum depression to said center line, and between said rim portion and a middle part of said central portion a plurality of apertures through each of said surfaces.

*13. A hydraulic tappet comprising: a hollow plunger member having an open end; a rod seat member disposed at and closing said open end of said hollow plunger member, said rod seat member having a passageway; and a partition member between said rod seat member and the interior of said hollow plunger member, said partition member having an abutting portion abutting said rod seat member in operative condition and entirely surrounding said passageway to prevent passage of liquid between said abutting portion and said rod seat member, and located between the center of said passageway and said abutting portion a spaced portion with a surface thereof spaced from said rod seat member with a part of said spaced surface underlying said passageway and another part of said spaced surface having an aperture therethrough.*

References Cited in the file of this patent or the original patent

UNITED STATES PATENTS

| | | |
|---|---|---|
| 2,688,318 | Voorhies et al. | Sept. 7, 1954 |
| 2,688,319 | Humphreys | Sept. 7, 1954 |
| 2,887,996 | Wood | May 26, 1959 |